United States Patent
Rozas et al.

(10) Patent No.: US 10,102,142 B2
(45) Date of Patent: Oct. 16, 2018

(54) VIRTUAL ADDRESS BASED MEMORY REORDERING

(71) Applicant: NVIDIA Corporation, Santa Clara, CA (US)

(72) Inventors: Guillermo J. Rozas, Los Gatos, CA (US); Bharath Krishnan, Santa Clara, CA (US); James Van Zoeren, Albuquerque, NM (US)

(73) Assignee: Nvidia Corporation, Santa Clara, CA (US)

( * ) Notice: Subject to any disclaimer, the term of this patent is extended or adjusted under 35 U.S.C. 154(b) by 860 days.

(21) Appl. No.: 13/727,457

(22) Filed: Dec. 26, 2012

(65) Prior Publication Data

US 2014/0181462 A1  Jun. 26, 2014

(51) Int. Cl.
  *G06F 9/30* (2006.01)
  *G06F 12/1027* (2016.01)
  *G06F 9/38* (2018.01)

(52) U.S. Cl.
  CPC ........ *G06F 12/1027* (2013.01); *G06F 9/3834* (2013.01)

(58) Field of Classification Search
  None
  See application file for complete search history.

(56) References Cited

U.S. PATENT DOCUMENTS

| | | |
|---|---|---|
| 4,620,217 A | 10/1986 | Songer |
| 4,648,045 A | 3/1987 | Demetrescu |
| 4,700,319 A | 10/1987 | Steiner |
| 4,862,392 A | 8/1989 | Steiner |
| 4,901,224 A | 2/1990 | Ewert |
| 5,185,856 A | 2/1993 | Alcorn et al. |
| 5,268,995 A | 12/1993 | Diefendorff et al. |
| 5,285,323 A | 2/1994 | Hetherington et al. |
| 5,357,604 A | 10/1994 | San et al. |
| 5,392,393 A | 2/1995 | Deering |
| 5,487,022 A | 1/1996 | Simpson et al. |
| 5,488,687 A | 1/1996 | Rich |
| 5,491,496 A | 2/1996 | Tomiyasu |
| 5,577,213 A | 11/1996 | Avery et al. |
| 5,579,473 A | 11/1996 | Schlapp et al. |

(Continued)

FOREIGN PATENT DOCUMENTS

| | | |
|---|---|---|
| CN | 1954338 | 5/2004 |
| CN | 101091203 | 5/2004 |

(Continued)

OTHER PUBLICATIONS

Bright; "Transactional memory going mainstream with Intel Haswell"; Feb. 8, 2012; arstechnica.com.*

(Continued)

*Primary Examiner* — William B Partridge (57) ABSTRACT

A method for detecting an instruction ordering violation in a CPU. The method includes receiving a reordered stream of instructions and detecting whether an ordering violation has occurred by using virtual addresses. The method further includes transferring results of the reordered stream of instructions from a load store buffer into a cache and detecting whether an ordering violation has occurred by using physical addresses. Subsequently, a recovery is initiated upon detection of an ordering violation.

20 Claims, 4 Drawing Sheets

(56) References Cited

U.S. PATENT DOCUMENTS

| | | | |
|---|---|---|---|
| 5,579,476 A | 11/1996 | Cheng et al. | |
| 5,581,721 A | 12/1996 | Wada et al. | |
| 5,600,584 A | 2/1997 | Schlafly | |
| 5,604,824 A | 2/1997 | Chui et al. | |
| 5,613,050 A | 3/1997 | Hochmuth et al. | |
| 5,615,350 A * | 3/1997 | Hesson et al. | 712/218 |
| 5,655,132 A | 8/1997 | Watson | |
| 5,701,444 A | 12/1997 | Baldwin | |
| 5,727,177 A * | 3/1998 | McMinn et al. | 712/218 |
| 5,748,937 A * | 5/1998 | Abramson et al. | 712/218 |
| 5,764,228 A | 6/1998 | Baldwin | |
| 5,777,628 A | 7/1998 | Buck-Gengler | |
| 5,831,640 A | 11/1998 | Wang et al. | |
| 5,850,572 A | 12/1998 | Dierke | |
| 5,864,342 A | 1/1999 | Kajiya et al. | |
| 5,941,940 A | 8/1999 | Prasad et al. | |
| 5,995,121 A | 11/1999 | Alcorn et al. | |
| 6,166,743 A | 12/2000 | Tanaka | |
| 6,173,366 B1 | 1/2001 | Thayer et al. | |
| 6,222,550 B1 | 4/2001 | Rosman et al. | |
| 6,229,553 B1 | 5/2001 | Duluk, Jr. et al. | |
| 6,259,460 B1 | 7/2001 | Gossett et al. | |
| 6,288,730 B1 | 9/2001 | Duluk, Jr. et al. | |
| 6,333,744 B1 | 12/2001 | Kirk et al. | |
| 6,351,806 B1 | 2/2002 | Wyland | |
| 6,353,439 B1 | 3/2002 | Lindholm et al. | |
| 6,407,740 B1 | 6/2002 | Chan | |
| 6,411,130 B1 | 6/2002 | Gater | |
| 6,411,301 B1 | 6/2002 | Parikh et al. | |
| 6,417,851 B1 | 7/2002 | Lindholm et al. | |
| 6,466,222 B1 | 10/2002 | Kao et al. | |
| 6,496,537 B1 | 12/2002 | Kranawetter et al. | |
| 6,525,737 B1 | 2/2003 | Duluk, Jr. et al. | |
| 6,526,430 B1 | 2/2003 | Hung et al. | |
| 6,542,971 B1 | 4/2003 | Reed | |
| 6,557,022 B1 | 4/2003 | Sih et al. | |
| 6,597,363 B1 | 7/2003 | Duluk, Jr. et al. | |
| 6,604,188 B1 | 8/2003 | Coon et al. | |
| 6,624,818 B1 | 9/2003 | Mantor et al. | |
| 6,636,221 B1 | 10/2003 | Morein | |
| 6,664,958 B1 | 12/2003 | Lather et al. | |
| 6,717,577 B1 | 4/2004 | Cheng et al. | |
| 6,718,542 B1 | 4/2004 | Kosche et al. | |
| 6,731,288 B2 | 5/2004 | Parsons et al. | |
| 6,734,861 B1 | 5/2004 | Van Dyke et al. | |
| 6,778,181 B1 | 8/2004 | Kilgariff et al. | |
| 6,806,886 B1 | 10/2004 | Zatz | |
| 6,839,828 B2 | 1/2005 | Gschwind et al. | |
| 6,924,808 B2 | 8/2005 | Kurihara et al. | |
| 6,947,053 B2 | 9/2005 | Malka et al. | |
| 6,980,209 B1 | 12/2005 | Donham et al. | |
| 6,980,222 B2 | 12/2005 | Marion et al. | |
| 6,999,100 B1 | 2/2006 | Leather et al. | |
| 7,034,828 B1 | 4/2006 | Drebin et al. | |
| 7,089,404 B1 | 8/2006 | Rozas et al. | |
| 7,158,141 B2 | 1/2007 | Chung et al. | |
| 7,187,383 B2 | 3/2007 | Kent | |
| 7,257,814 B1 | 8/2007 | Melvin et al. | |
| 7,280,112 B1 | 10/2007 | Hutchins | |
| 7,298,375 B1 | 11/2007 | Hutchins | |
| 7,430,654 B2 | 9/2008 | Huang et al. | |
| 7,450,120 B1 | 11/2008 | Hakura et al. | |
| 7,477,260 B1 | 1/2009 | Nordquist | |
| 7,590,825 B2 * | 9/2009 | Krimer et al. | 712/216 |
| 7,634,635 B1 | 12/2009 | Holscher et al. | |
| 7,659,909 B1 | 2/2010 | Hutchins | |
| 7,710,427 B1 | 5/2010 | Hutchins et al. | |
| 7,928,990 B2 | 4/2011 | Jiao et al. | |
| 7,941,645 B1 | 5/2011 | Riach et al. | |
| 7,969,446 B2 | 6/2011 | Hutchins et al. | |
| 8,537,168 B1 | 9/2013 | Steiner et al. | |
| 8,773,447 B1 | 7/2014 | Donham | |
| 8,860,722 B2 | 10/2014 | Cabral et al. | |
| 2002/0105519 A1 | 8/2002 | Lindholm et al. | |
| 2002/0126126 A1 | 9/2002 | Baldwin | |
| 2002/0129223 A1 | 9/2002 | Takayama et al. | |
| 2002/0169942 A1 | 11/2002 | Sugimoto | |
| 2003/0115233 A1 | 6/2003 | Hou et al. | |
| 2003/0189565 A1 | 10/2003 | Lindholm et al. | |
| 2004/0012597 A1 | 1/2004 | Zatz et al. | |
| 2004/0012599 A1 | 1/2004 | Laws | |
| 2004/0012600 A1 | 1/2004 | Deering et al. | |
| 2004/0024260 A1 | 2/2004 | Winkler et al. | |
| 2004/0100474 A1 | 5/2004 | Demers et al. | |
| 2004/0114813 A1 | 6/2004 | Boliek et al. | |
| 2004/0119710 A1 | 6/2004 | Piazza et al. | |
| 2004/0126035 A1 | 7/2004 | Kyo | |
| 2004/0130552 A1 | 7/2004 | Duluk, Jr. et al. | |
| 2004/0194084 A1 | 9/2004 | Matsunami et al. | |
| 2004/0246260 A1 | 12/2004 | Kim et al. | |
| 2005/0086644 A1 | 4/2005 | Chkodrov et al. | |
| 2005/0122330 A1 | 6/2005 | Boyd et al. | |
| 2005/0134588 A1 | 6/2005 | Aila et al. | |
| 2005/0135433 A1 | 6/2005 | Chang et al. | |
| 2005/0162436 A1 | 7/2005 | Van Hook et al. | |
| 2005/0223195 A1 | 10/2005 | Kawaguchi | |
| 2005/0231506 A1 | 10/2005 | Simpson et al. | |
| 2005/0237337 A1 | 10/2005 | Leather et al. | |
| 2005/0280655 A1 | 12/2005 | Hutchins et al. | |
| 2006/0007234 A1 | 1/2006 | Hutchins et al. | |
| 2006/0028469 A1 | 2/2006 | Engel | |
| 2006/0152519 A1 | 7/2006 | Hutchins et al. | |
| 2006/0155964 A1 | 7/2006 | Totsuka | |
| 2006/0177122 A1 | 8/2006 | Yasue | |
| 2006/0288195 A1 | 12/2006 | Ma et al. | |
| 2007/0030278 A1 | 2/2007 | Prokopenko et al. | |
| 2007/0165029 A1 | 7/2007 | Lee et al. | |
| 2007/0236495 A1 | 10/2007 | Gruber et al. | |
| 2007/0279408 A1 | 12/2007 | Zheng et al. | |
| 2007/0285427 A1 | 12/2007 | Morein et al. | |
| 2007/0288902 A1 | 12/2007 | Lev et al. | |
| 2010/0023707 A1 | 1/2010 | Hohmuth et al. | |
| 2010/0211933 A1 | 8/2010 | Kiel et al. | |
| 2014/0181404 A1 | 6/2014 | Chaudhary et al. | |
| 2014/0372990 A1 | 12/2014 | Strauss | |

FOREIGN PATENT DOCUMENTS

| | | |
|---|---|---|
| EP | 1665165 | 5/2004 |
| EP | 1745434 | 5/2004 |
| EP | 1771824 | 5/2004 |
| JP | 05150979 A2 | 6/1993 |
| JP | 11053187 A2 | 2/1999 |
| JP | 2000047872 A2 | 2/2000 |
| JP | 2002073330 A2 | 3/2002 |
| JP | 2002171401 | 6/2002 |
| JP | 2004199222 | 7/2004 |
| JP | 2006196004 | 7/2006 |
| JP | 2008161169 | 7/2008 |
| WO | 2005112592 | 5/2004 |
| WO | 2006007127 | 5/2004 |
| WO | 2005114582 | 12/2005 |
| WO | 2005114646 | 12/2005 |

OTHER PUBLICATIONS

"Transactional Memory"; Oct. 15, 2012; wikipedia.*
"Transactional Memory"; Dec. 22, 2015; wikipedia.*
Reinders; "Transactional Synchronization in Haswell"; Feb. 7, 2012; Intel Developer Zone.*
Herlihy et al.; "Transactional memory: architectural support for lock-free data structures"; May 1993; ACM SIGARCH; vol. 21 Issue 2; pp. 289-300.*
PCT Notificaiton of Transmittal of The International Search Report and The Written Opinion of the International Searching Authority, or the Declaration. PCT/US05/17032; Applicant NVIDA Corporation; dated Nov. 9, 2005.
PCT Notificaiton of Transmittal of The International Search Report or the Declaration. PCT/US05/17526; Applicant Hutchins, Edward A; dated Jan. 17, 2006.
PCT Notificaiton of Transmittal of The International Search Report and The Written Opinion of the International Searching Authority, (56) References Cited

OTHER PUBLICATIONS or the Declaration. PCT/US05/17031; Applicant NVIDA Corporation; dated Feb. 9, 2007.

"Interleaved Memory." http://www.webopedia.com/TERM/I/interleaved_memory.html; Sep. 9, 2008; pp. 3. (authors name not provided).

Moller, et al.; Real-Time Rendering, 2nd ed., 2002, A K Peters Ltd., pp. 92-99, Jul. 2002.

The Free Online Dictionary, Thesaurus and Encyclopedia, definition for cache; http://www.thefreedictionary.com/cache; retrieved Nov. 3, 2012; pp. 3. (authors name not provided).

Zaharieva-Stoyanova E I: "Data-flow analysis in superscalar computer architecture execution", Telecommunications in Modern Satellite, Cable and Broadcasting Services, Nov. 2003; pp. 4.

"Sideband," http://www.encyclopedia.com/html/s1/sideband.asp; Aug. 2006, pp. 4. (authors name not provided).

\* cited by examiner

301
Receive a reordered stream of instructions

302
Detect whether an ordering violation has occurred by using virtual addresses

303
Transfer the results of the reordered stream of instructions from a load store buffer into a cache

304
Detect whether an ordering violation has occurred by using physical addresses

305
Initiate a recovery upon detection of an ordering violation

VIRTUAL ADDRESS BASED MEMORY REORDERING

FIELD OF THE INVENTION

The present invention is generally related to computer systems.

BACKGROUND OF THE INVENTION

Modern processors reorder memory operations to increase performance. The reason for such reordering might be that some of the operands to some of the memory operations (i.e. addresses for loads and stores, store data for stores) are available at different times, and executing said memory instructions in program order would result in reduced performance and utilization, as the operands to a younger operation might be available earlier than the operands to an older operation.

Such reordering, however, is not always safe. For example, if the machine reorders a younger load to location X ahead of an older store to location X, the load will produce the wrong value, and the machine will operate incorrectly unless it detects such a condition and initiates recovery actions which ultimately result in the younger load effectively executing after the older store.

Some machines reorder operations only after their addresses are known, thereby preventing unsafe re-orderings, but reducing throughput and performance if the address operands are late. For example, a single store with an unresolved address can prevent many younger loads and stores from executing early even though the likelihood of such a conflict is often very low.

The memory reordering unit (MRU) is a unit that detects conflicts between loads and stores that have been reordered by the machine and initiates recovery action when an unsafe reordering is detected. The memory reordering unit is informed of the program order (or ordering constraints) of the loads and stores, and on a violation of order, initiates recovery. The memory reordering unit is either a part of or coupled to a load-store unit, but is not itself involved in the data portion of the execution of loads and stores—it only cares about addresses and sizes to detect overlap conditions that may constitute a violation of order.

In addition to such local violations of order (where a single-threaded program would operate incorrectly), depending on the architecture being implemented, there can also be violations of global order, where the consistency model for the architecture requires that some operations not be observably reordered by CPU cores such that other agents (e.g, device Direct Memory Access (DMA) or Central Processing Unit (CPU) cores running other threads in a multi-threaded program) can detect that reordering occurred.

The MRU can also detect such violations (potential or actual) of global order if snoops are sent to the MRU as well as to the caches. The MRU can effectively implement Fray's algorithm or variants as required by the consistency model for the architecture.

Typically such a reordering unit is based on physical addresses, as two different memory operations can use different virtual addresses that resolve to the same physical address, and if only virtual addresses are compared, two memory instructions (e.g., a load and a store) may appear not to overlap because the virtual addresses used are different, even though they both actually access the same location because the physical addresses are the same. Physical addresses, however, are known later than virtual addresses, making some overlap comparisons more difficult or introducing additional recovery situations.

It would be advantageous to use virtual addresses in the memory reordering unit and somehow handle the virtual address alias problem (two virtual addresses mapping to the same physical address) and the global ordering problem (if it matters for the architecture) by some other means.

Although virtual aliases have to be handled correctly, they are very rarely used in close proximity, hence the likelihood of an incorrect reordering detection based on virtual addresses is low, but correctness demands that it be detected.

SUMMARY OF THE INVENTION

Embodiments of the present invention advantageously utilize the feature whereby physical addresses are known later than virtual addresses. Embodiments of the present invention advantageously utilize virtual addresses in the memory reordering unit and efficiently handle a virtual address alias problem where two virtual addresses map to the same physical address, in addition to any global ordering problem.

In one embodiment, the present invention implements a method for detecting an instruction ordering violation in a CPU. The method includes receiving a reordered stream of instructions and detecting whether an ordering violation has occurred by using virtual addresses. The method further includes transferring results of the reordered stream of instructions from a load store buffer into a cache and detecting whether an ordering violation has occurred by using physical addresses. Subsequently, a recovery is initiated upon detection of an ordering violation.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of non-transitory electrical or magnetic signals capable of being stored, transferred, combined, compared, and otherwise manipulated in a computer readable storage medium of a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention advantageously utilize the feature whereby physical addresses are known later than virtual addresses. Embodiments of the present invention advantageously utilize virtual addresses in the memory reordering unit and efficiently handle a virtual address alias problem where two virtual addresses map to the same physical address, in addition to any global ordering problem.

Figure 1:
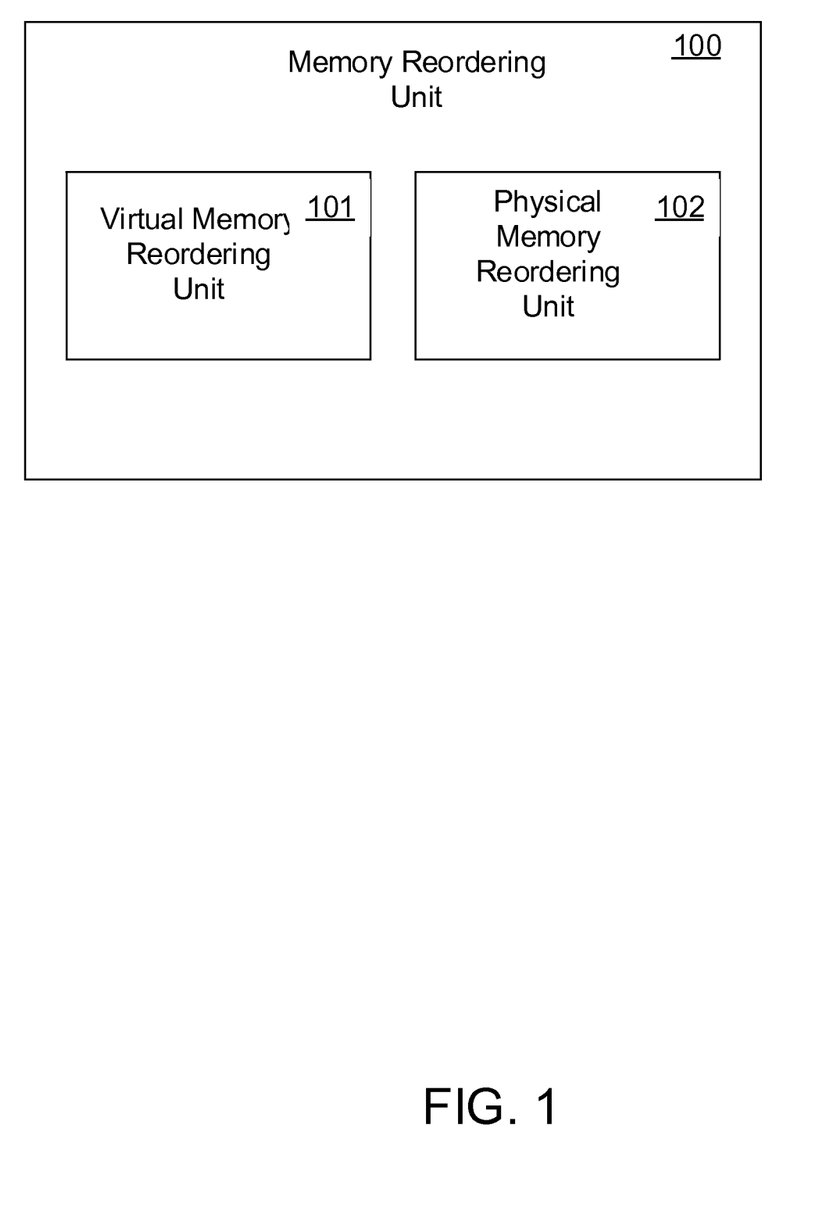
FIG. 1 shows a memory reordering unit in accordance with one embodiment of the present invention.

FIG. 1 shows a memory reordering unit 100 in accordance with one embodiment of the present invention. As depicted in FIG. 1, embodiments of the present invention decompose a traditional memory-reordering unit into two sub-units, a virtual-address based virtual memory reordering unit 101, and a physical-address based physical memory reordering unit 102. The units 101 and 102 take advantage of the fact that although virtual aliases have to be handled correctly, they are very rarely used in close proximity, hence the likelihood of an incorrect reordering detection based on virtual addresses is low, but correctness demands that it be detected, hence, the physical memory reordering unit 102.

The virtual-address based version (VMRU for virtual memory reordering unit) detects ordering violations by using only virtual addresses. As such, it can be very early in the pipeline since it does not need to wait for the TLB results. It compares the virtual addresses and sizes of loads and stores, and taking into account their program order (or otherwise-specified ordering constraints) it performs overlap detection and triggers recovery when a violation of order is detected.

Figure 2:
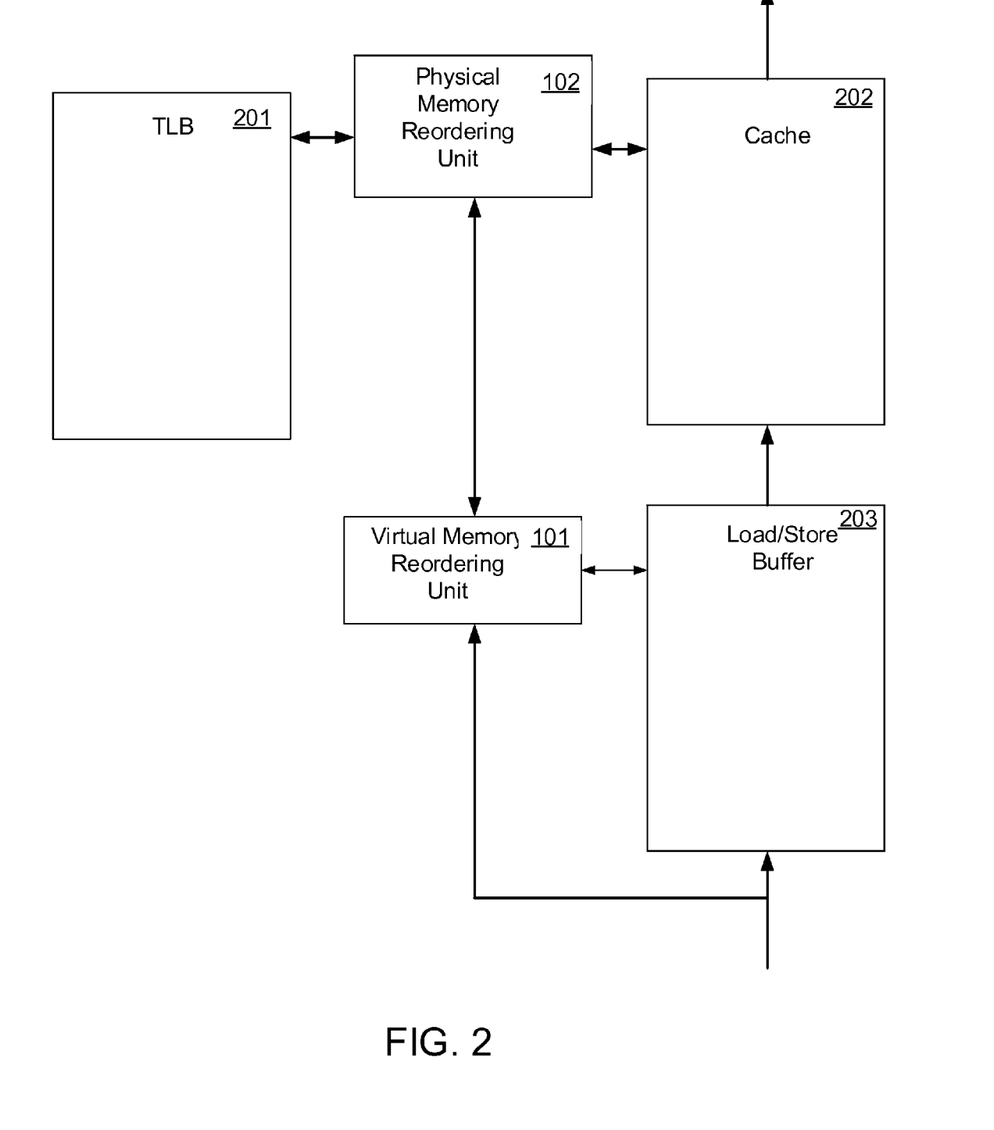
FIG. 2 shows a diagram depicting a Virtual Memory Reordering Unit (VMRU) and a Physical Memory Reordering Unit (PMRU) in conjunction with a load/store buffer 203, cache 202 and TLB in accordance with one embodiment of the present invention.

FIG. 2 shows a diagram depicting a VMRU 101 and a PMRU 102 in conjunction with a load/store buffer 203, cache 202 and TLB 201 in accordance with one embodiment of the present invention.

A physical-address based version (PMRU for physical memory reordering unit) does not detect ordering violations per-se, but detects virtual aliases instead. As such, only cache line addresses need to be compared. The purpose of the physical-address version is to detect situations under which the virtual-address based reordering unit may have failed to report an ordering violation due to the use of virtual aliases in close-enough proximity. As such, the PMRU may be conservative (depending on the actual implementation used) as the particular virtual aliases detected may not have resulted in a violation of order. For example, the older store may have stored to some bytes in a cache line while the younger load may have loaded from different bytes in the same cache line.

In one embodiment, it should be noted that unlike the VMRU, which detects precise overlap, the physical-address based version can be implemented such that it does not need byte-overlap comparison and only examines cache line addresses. It can also execute later in the pipeline, once Translation Lookaside Buffer (TLB) results (physical addresses) are known. In particular, in one embodiment, all it needs to do is prevent the commitment or retirement (depending on the micro-architecture) of the younger operation that may have a virtual alias problem.

This decoupling off the MRU into VMRU and PMRU is particularly advantageous when using a virtually-indexed cache that resolves aliases as if they were misses, as virtual aliases will be detected as part of miss conditions, and the PMRU only needs to be queried when resolving such misses. In fact, if such virtual alias conflicts are resolved by evicting the line and re-fetching it (e.g. from L2), the PMRU only needs to be queried on cache line evictions (whether prompted by a virtual alias detection or not), since an eviction (and re-fetch) is required before a line can be accessed under a different virtual address.

It should be further noted that, in one embodiment, querying the PMRU on evictions caused by coherence snoops also results in detection of violations of global memory order (between different agents) if the architecture in question has any such constraints.

Thus the VMRU detects local violations of order assuming that there are no virtual aliases, while the PMRU detects both potential virtual alias conflicts and potential violations of global order due to local reordering. The VMRU performs precise overlap comparisons, while the PMRU only needs to perform comparisons of cache line addresses.

Additionally, it should be noted that the particular details of the decomposition into VMRU and PMRU depend on the rest of the implementation of the machine, and can be adapted to both transactional and non-transactional micro-architectures, to both in-order and out-of-order micro-architectures, and to scalar, superscalar, and very long instruction word (VLIW) micro-architectures.

Figure 3:
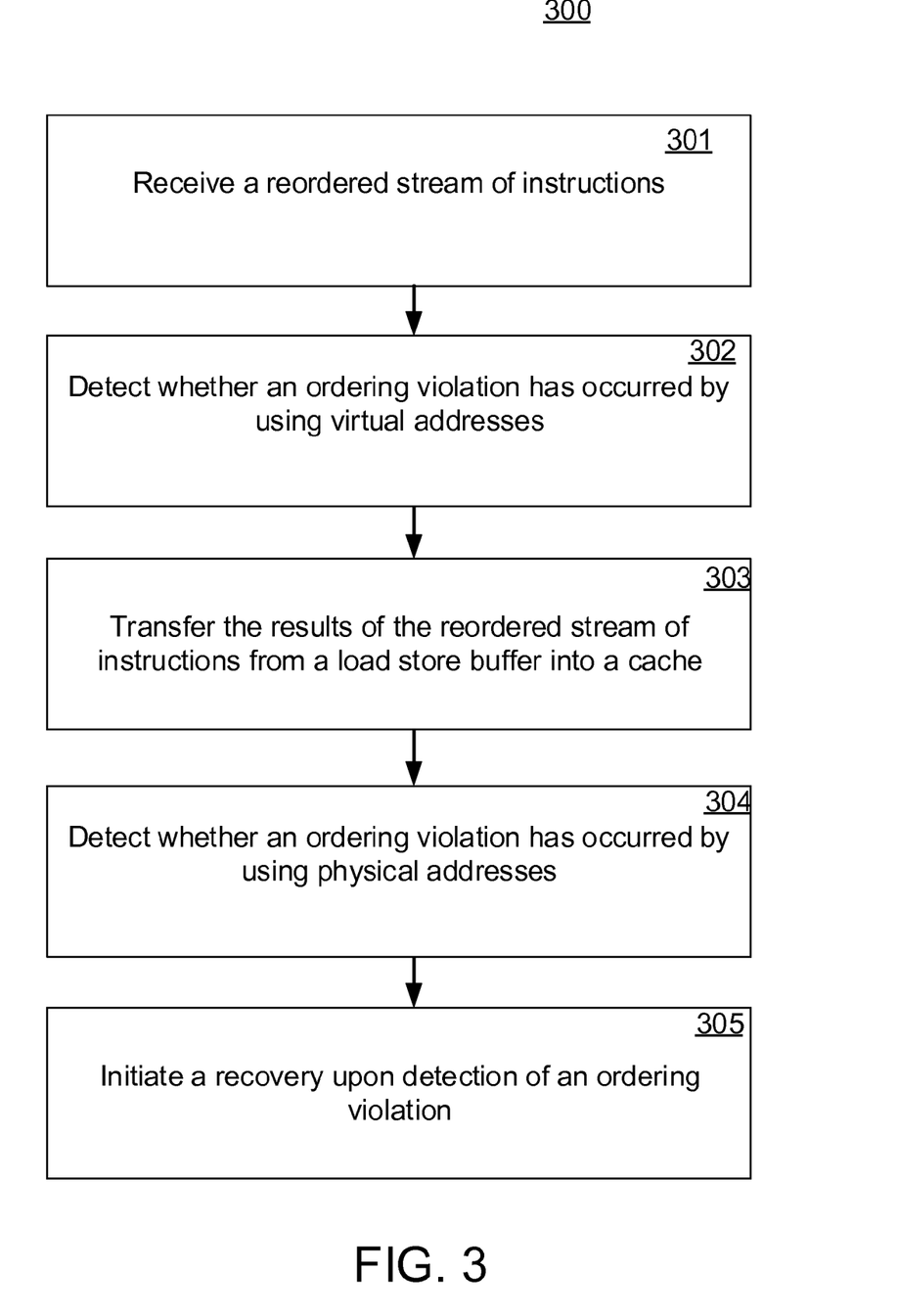
FIG. 3 shows a flowchart of an MRU process in accordance with one embodiment of the present invention.

FIG. 3 shows a flowchart of an MRU process 300 in accordance with one embodiment of the present invention. As depicted in FIG. 3, process 300 shows exemplary overview steps as performed by an MRU in accordance with the present invention (e.g., MRU 100).

Process 300 begins in step 301 where a reordered stream of instructions are received. The instructions are annotated with an encoding corresponding to their original order so that the VMRU can determine which have been incorrectly reordered (locally). As described above, the stream of instructions has been reordered in order to exploit instruction level parallelism and increase the efficiency of execution. In step 302, the VMRU functions by detecting whether an ordering violation has occurred by using virtual addresses as described above. In step 303, the results of the reordered stream of instructions are transferred from the load store buffer into the cache. In step 304, the PMRU functions by detecting whether an ordering violation has occurred by using physical addresses as described above. The PMRU is informed when instructions commit or retire and detects ordering violations for not yet committed/retired instructions. And subsequently, in step 305, a recovery is initiated upon detection of an ordering violation (e.g., causing a cache miss, flushing the cache, re-executing the stream of instructions in program order, or the like).

It should be noted that depending on whether the machine can recover from miss-speculation, step 303 may only happen after it is known that no recovery will take place. Additionally, it should be noted that in one implementation where the cache is used to implement the PMRU and it provides good filtering so that we only check evictions in a PMRU, embodiments of the present invention could also be implemented by sending everything to a PMRU, or by performing some other filter.

Figure 4:
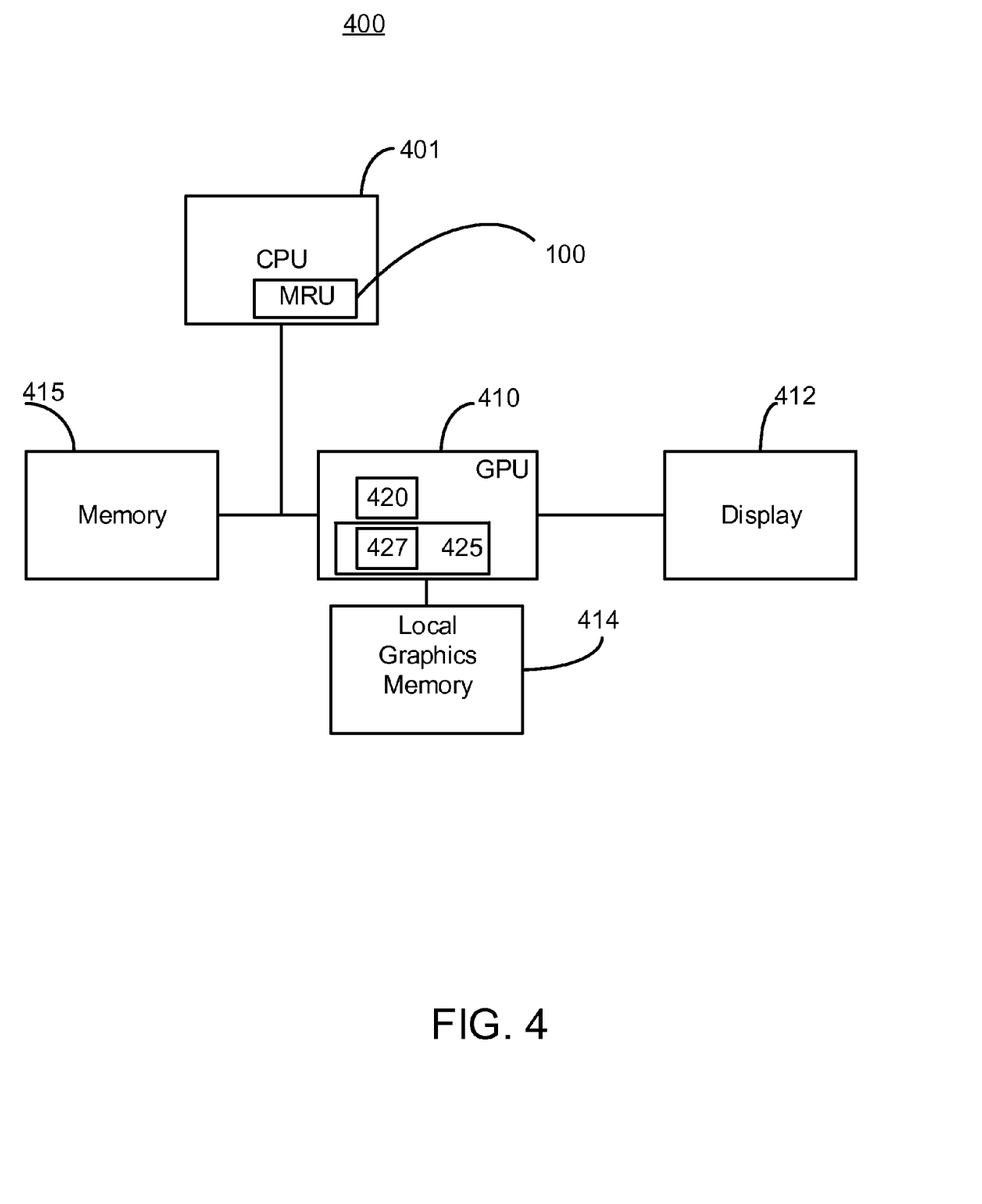
FIG. 4 shows a computer system in accordance with one embodiment of the present invention.

Computer System Platform:

FIG. 4 shows a computer system 400 in accordance with one embodiment of the present invention. Computer system 400 depicts the components of a basic computer system in accordance with embodiments of the present invention providing the execution platform for certain hardware-based and software-based functionality. In general, computer system 400 comprises at least one CPU 401, a system memory 415, and at least one graphics processor unit (GPU) 410. The CPU 401 can be coupled to the system memory 415 via a bridge component/memory controller (not shown) or can be directly coupled to the system memory 415 via a memory controller (not shown) internal to the CPU 401. The GPU 410 is coupled to a display 412. The GPU 410 is shown including an allocation/de-allocation component 420 for just-in-time register allocation for a multithreaded processor. A register file 427 and an exemplary one of the plurality of registers (e.g., register 425) comprising the register file is also shown within the GPU 410. One or more additional GPUs can optionally be coupled to system 400 to further increase its computational power. The GPU(s) 410 is coupled to the CPU 401 and the system memory 415. System 400 can be implemented as, for example, a desktop computer system or server computer system, having a powerful general-purpose CPU 401 coupled to a dedicated graphics rendering GPU 410. In such an embodiment, components can be included that add peripheral buses, specialized graphics memory, IO devices, and the like. Similarly, system 400 can be implemented as a handheld device (e.g., cellphone, etc.) or a set-top video game console device such as, for example, the Xbox®, available from Microsoft Corporation of Redmond, Wash., or the PlayStation3®, available from Sony Computer Entertainment Corporation of Tokyo, Japan.

It should be appreciated that the GPU 410 can be implemented as a discrete component, a discrete graphics card designed to couple to the computer system 400 via a connector (e.g., Accelerated Graphics Port (AGP) slot, Peripheral Component Interconnect-Express (PCI-Express) slot, etc.), a discrete integrated circuit die (e.g., mounted directly on a motherboard), or as an integrated GPU included within the integrated circuit die of a computer system chipset component (not shown). Additionally, a local graphics memory 414 can be included for the GPU 410 for high bandwidth graphics data storage.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of detecting an instruction ordering violation in a processor, the method comprising:
   receiving a reordered stream of instructions;
   detecting whether an ordering violation has occurred by using virtual addresses of said stream of instructions;
   transferring results of the reordered stream of instructions from a load store buffer into a cache;
   based on cache line addresses comprising translation lookaside buffer results, detecting whether an ordering violation has occurred by using physical addresses, wherein the detecting whether an ordering violation has occurred by using physical addresses is performed after the detecting whether an ordering violation has occurred by using virtual addresses and after the physical addresses are known; and
   initiating a recovery upon detection of an ordering violation.

2. The method of claim 1, wherein a virtual address memory reordering unit coupled to the load store buffer is used to detect whether an ordering violation has occurred by using virtual addresses.

3. The method of claim 1, wherein a physical address memory reordering unit coupled to the cache and a Translation Lookaside Buffer (TLB) is used to detect whether an ordering violation has occurred by using physical addresses.

4. The method of claim 1, wherein the recovery comprises a cache line flush of a cache line written to as a result of the ordering violation.

5. The method of claim 1, wherein the recovery comprises re-executing the stream of instructions in original program order.

6. The method of claim 1, wherein the processor comprises a superscalar microarchitecture.

7. The method of claim 1, wherein the processor comprises an out-of-order microarchitecture.

8. A Central Processing Unit (CPU) having a memory reordering unit for implementing a method for processing instructions, the method comprising:
   receiving a reordered stream of instructions;

detecting whether an ordering violation has occurred by using virtual addresses;

transferring results of the reordered stream of instructions from a load store buffer into a cache;

based on cache line addresses comprising translation lookaside buffer results, detecting whether an ordering violation has occurred by using physical addresses, wherein the detecting whether an ordering violation has occurred by using physical addresses is performed after the detecting whether an ordering violation has occurred by using virtual addresses and after the physical addresses are known; and initiating a recovery upon detection of an ordering violation.

9. The CPU of claim 8, wherein a virtual address memory reordering unit coupled to the load store buffer is used to detect whether an ordering violation has occurred by using virtual addresses.

10. The CPU of claim 8, wherein a physical address memory reordering unit coupled to the cache and a Translation Lookaside Buffer (TLB) is used to detect whether an ordering violation has occurred by using physical addresses.

11. The CPU of claim 8, wherein the recovery comprises a cache line flush of a cache line written to as a result of the ordering violation.

12. The CPU of claim 8, wherein the recovery comprises re-executing the stream of instructions in original program order.

13. The CPU of claim 8, wherein the CPU comprises a superscalar microarchitecture.

14. The CPU of claim 8, wherein the CPU comprises an out-of-order microarchitecture.

15. A computer system, comprising: a computer system having a Central Processing Unit (CPU) including a memory reordering unit for implementing a method for processing instructions, the method comprising:

receiving a reordered stream of instructions;

detecting whether an ordering violation has occurred by using virtual addresses;

transferring results of the reordered stream of instructions from a load store buffer into a cache;

based on cache line addresses comprising translation lookaside buffer results, detecting whether an ordering violation has occurred by using physical addresses, wherein the detecting whether an ordering violation has occurred by using physical addresses is performed after the detecting whether an ordering violation has occurred by using virtual addresses and after the physical addresses are known; and initiating a recovery upon detection of an ordering violation.

16. The computer system of claim 15, wherein a virtual address memory reordering unit coupled to the load store buffer is used to detect whether an ordering violation has occurred by using virtual addresses.

17. The computer system of claim 15, wherein a physical address memory reordering unit coupled to the cache and a Translation Lookaside Buffer (TLB) is used to detect whether an ordering violation has occurred by using physical addresses.

18. The computer system of claim 17, wherein violations of global order consistency are detected by examining snoops in a physical Memory Reordering Unit (MRU).

19. The computer system of claim 15, wherein the recovery comprises re-executing the stream of instructions in original program order.

20. The computer system of claim 15, wherein the CPU comprises a superscalar microarchitecture.

* * * * *